United States Patent [19]

Safranek

[11] Patent Number: 4,648,763

[45] Date of Patent: Mar. 10, 1987

[54] COUNTERBALANCED ADJUSTABLE ROUTER BIT

[75] Inventor: Leland Safranek, Atascadero, Calif.

[73] Assignee: Safranek Enterprises, Inc., Atascadero, Calif.

[21] Appl. No.: 897,794

[22] Filed: Aug. 18, 1986

[51] Int. Cl.⁴ .......................... B23C 9/00; B23B 41/00; B26D 1/12

[52] U.S. Cl. ..................... 409/234; 407/45; 408/150; 408/151; 408/188

[58] Field of Search ............... 409/232, 234, 204, 231, 409/191; 82/2 E, 1.2, 1 B; 407/44, 45, 120; 408/173, 180, 150, 151, 187, 188, 143

[56] References Cited

U.S. PATENT DOCUMENTS

| | | | |
|---|---|---|---|
| 2,182,770 | 12/1939 | Woodcock | 408/150 X |
| 2,253,085 | 8/1941 | Morrell | 408/150 |
| 2,711,107 | 6/1955 | Jensen | 407/45 |
| 2,905,059 | 9/1959 | Fabish | 407/44 |
| 3,146,641 | 9/1964 | Benjamin et al. | 408/151 |
| 3,180,187 | 4/1965 | McFerren | 82/1 |
| 3,732,760 | 5/1973 | Parks | 408/150 |
| 3,739,666 | 6/1973 | Wright et al. | 82/59 |
| 3,961,857 | 6/1976 | Koblesky | 408/83 |
| 4,040,315 | 8/1977 | Bellingham | 82/2 E |
| 4,184,391 | 1/1980 | Eckle | 82/1.2 |
| 4,211,510 | 7/1980 | Hopkins | 408/186 |
| 4,577,535 | 3/1986 | Klabunde | 409/191 |
| 4,590,828 | 5/1986 | Sullivan | 82/2 E |

FOREIGN PATENT DOCUMENTS

| | | | |
|---|---|---|---|
| 841317 | 5/1970 | Canada | 408/143 |
| 2158717 | 8/1973 | Fed. Rep. of Germany | 408/143 |
| 2342809 | 9/1977 | France | 409/234 |
| 61404 | 4/1982 | Japan | 409/234 |
| 270609 | 9/1950 | Switzerland | 408/150 |
| 598702 | 3/1978 | U.S.S.R. | 408/150 |

Primary Examiner—William R. Briggs
Attorney, Agent, or Firm—Daniel C. McKown

[57] ABSTRACT

A router bit having an adjustable blade for cutting various widths of grooves includes a mechanism for maintaining static balance about the axis of rotation for all positions of the cutting blade within the range of adjustment. The router bit includes a main body adapted to be held and rotated by a chuck, and which includes a bore whose axis is parallel to but displaced from the axis of rotation of the main body. An arbor with an offset cutting blade is adjustably mounted in the bore, and the width of the groove is determined by the angular position of the arbor within the bore. However, such adjustment alters the static balance of the router bit about its axis of rotation. In accordance with the present invention, this source of unbalance is compensated by providing a counterweight whose position is dependent on the angular position of the arbor within the bore. In the preferred embodiment a cam on the shaft of the arbor bears against and determines the position of the counterweight.

4 Claims, 7 Drawing Figures

COUNTERBALANCED ADJUSTABLE ROUTER BIT

BACKGROUND OF THE INVENTION

1. Field of the Invention

The present invention is in the field of machine tools for cutting, and more particularly relates to a router bit that is adjstable and that remains substantially counterbalanced for all conditions of adjustment. A router bit is normally held in a chuck for rotation about an axis as a work piece is fed into the path of the cutting edge of the router bit in a direction perpendicular to the axis, for the purpose of cutting a groove, called a dado, across the face of the work piece.

2. The Prior Art

The present invention falls into the class of machine tools in which an arbor is adjustably positioned and then fixed in a bore whose axis is parallel to but displaced from the axis of rotation of the tool. A cutting blade affixed to the arbor extends in a direction perpendicular to the axis of the bore. The diameter of the cut is adjusted prior to use by rotating the cutting edge about the axis of the bore.

This type of cutting tool is described in U.S. Pat. No. 4,211,510 to Hopkins who uses it in a boring head. Swiss Pat. No. 270,609 of Engensperger appears to show a milling head comparable to that of Hopkins. In U.S. Pat. No. 3,961,857, Koblesky also shows the use of this type of mounting in a boring bar. In U.S. Pat. No. 3,146,641, Benjamin, et al. show the concept employed in a recessing tool. Finally, in U.S. Pat. No. 2,253,085 Morrell shows the concept applied in a tool for cutting washers from a sheet of material.

None of the above patents teaches or suggests the use of counterbalancing the tool.

Various mechanisms for providing counterbalancing are described in the following patents.

In U.S. Pat. No. 4,040,315, Bellingham shows counterweights that are radially movable, within limits in slots.

In U.S. Pat. No. 4,184,391, Eckle also shows a counterweight that is slidable radially in a guide.

In U.S. Pat. No. 3,180,187, McFerren shows a counterweight that is slidable radially in a channel.

Finally, in U.S. Pat. No. 3,739,666, Wright, et al. show a tube cutting head in which a fixed counterweight is located on the body of the tool.

As will be seen below, the counterbalancing mechanisms used in these patents are completely different in nature from that used in the present invention.

The patents referred to above are discussed at greater length in an Information Disclosure Statement lodged in the file of this application.

SUMMARY OF THE INVENTION

The present invention grew out of a recognition of the need for an adjustable router bit that remains approximately counterbalanced for each adjustment setting.

The present invention includes a main body that is adapted to be held in a chuck for rotation about an axis. The main body also includes a bore that is parallel to but off-set from the axis of rotation. An arbor, inserted within the bore, may be turned about the axis of the bore to adjust the width of the groove or dado that is to be cut. The cutting blade is affixed to the end of the arbor and the cutting edge is displaced from the axis of the bore. When the width of the dado is adjusted, the displacement of the cutting edge from the axis of the bore is changed, and this alters the balance of the router bit.

To prevent the router bit from being substantially out of balance, the present invention includes the provision of a novel counterbalance. In accordance with the present invention, the position of the counterbalance is shifted by contact with a specially shaped portion of the arbor which serves as a cam.

In a preferred embodiment, the counterweight has the form of a disk through which a non-concentric hole extends. The disk is pivotably attached to the face of the main body of the router bit so that it can be displaced in its own plane for effecting the adjustment.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

All of the Figures relate to a specific preferred embodiment of the invention. However, the invention is not limited to this particular embodiment, but includes such variations as may be within the scope of the claims below.

The router bit of the preferred embodiment is adjustable to permit cutting of dadoes of various sizes in such materials as plywood, particle board, hardboard, etc., that are intended for use in the cabinet and furniture industry. Unlike the boring and facing machines of the prior art which are larger and which turn at a slower speed for cutting metals, and router bit of the present invention can be operated at speeds of 22000 revolutions per minute with only minimal vibration. Since, for a given unbalanced moment, the centrifugal force is proportional to the angular velocity, the desirability of keeping the router bit balanced can be understood.

If the router bit were not adjustable, keeping it balanced would be a relatively simple matter. However, the eccentric mechanism used in the present invention for adjusting the width of the dado to be cut necessarily produces an unbalanced mass distribution.

Through the use of the present invention, this problem is solved by adjusting the position of the counterweight in relation to the cutter blade position. The user of the present invention needs not to be concerned with adjusting the counterbalance weight, since this is done automatically by the mechanism when the cutter blade is adjusted.

Figure 1:
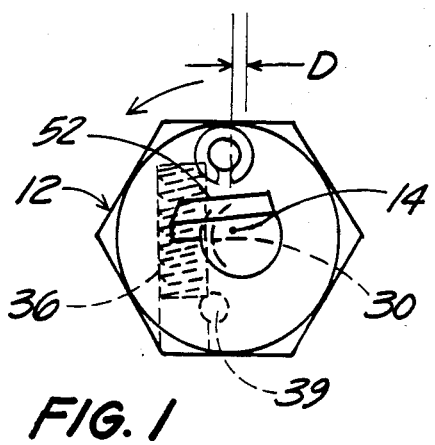
FIG. 1 is a top plan view showing a preferred embodiment of the present invention with the cutting blade adjusted to produce a minimum width dado.
Figure 2:
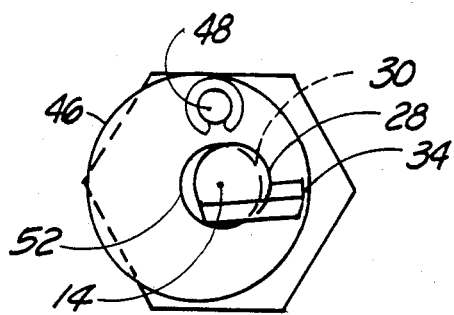
FIG. 2 is a top plan view of the preferred embodiment with the cutting blade adjusted to produce the maximum width dado.
Figure 3:
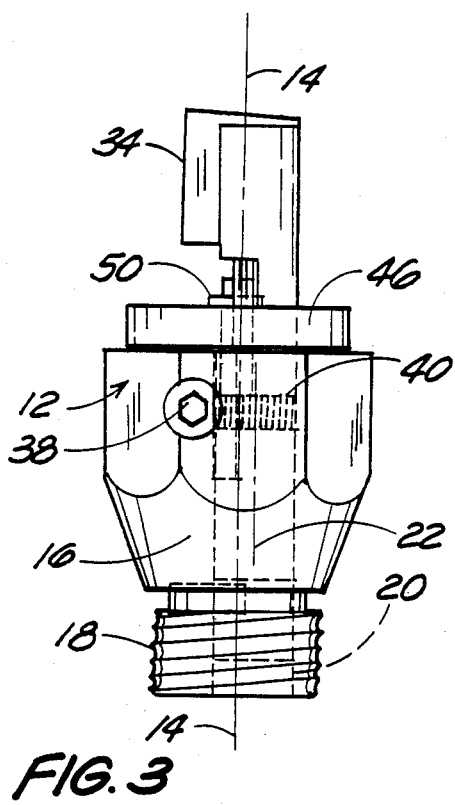
FIG. 3 is a side elevation view of the preferred embodiment with the blade in the position shown in FIG. 1.
Figure 4:
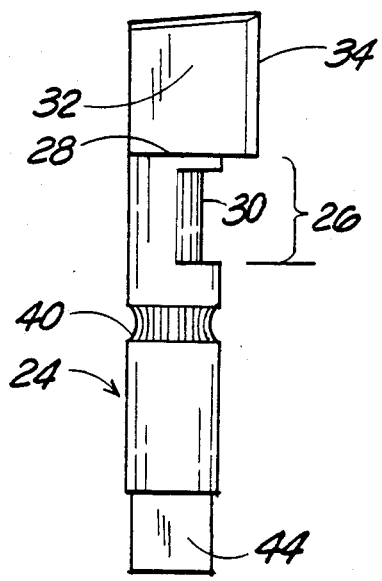
FIG. 4 is a side elevation view of the arbor used in the preferred embodiment.
Figure 5:
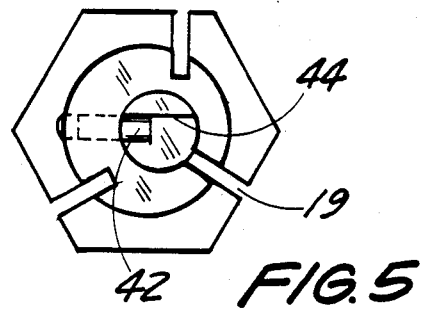
FIG. 5 is a bottom plan view of the preferred embodiment with the cutting blade adjusted as shown in FIG. 1.
Figure 6:
FIG. 6 is a bottom plan view of the arbor shown in FIG. 4.
Figure 7:
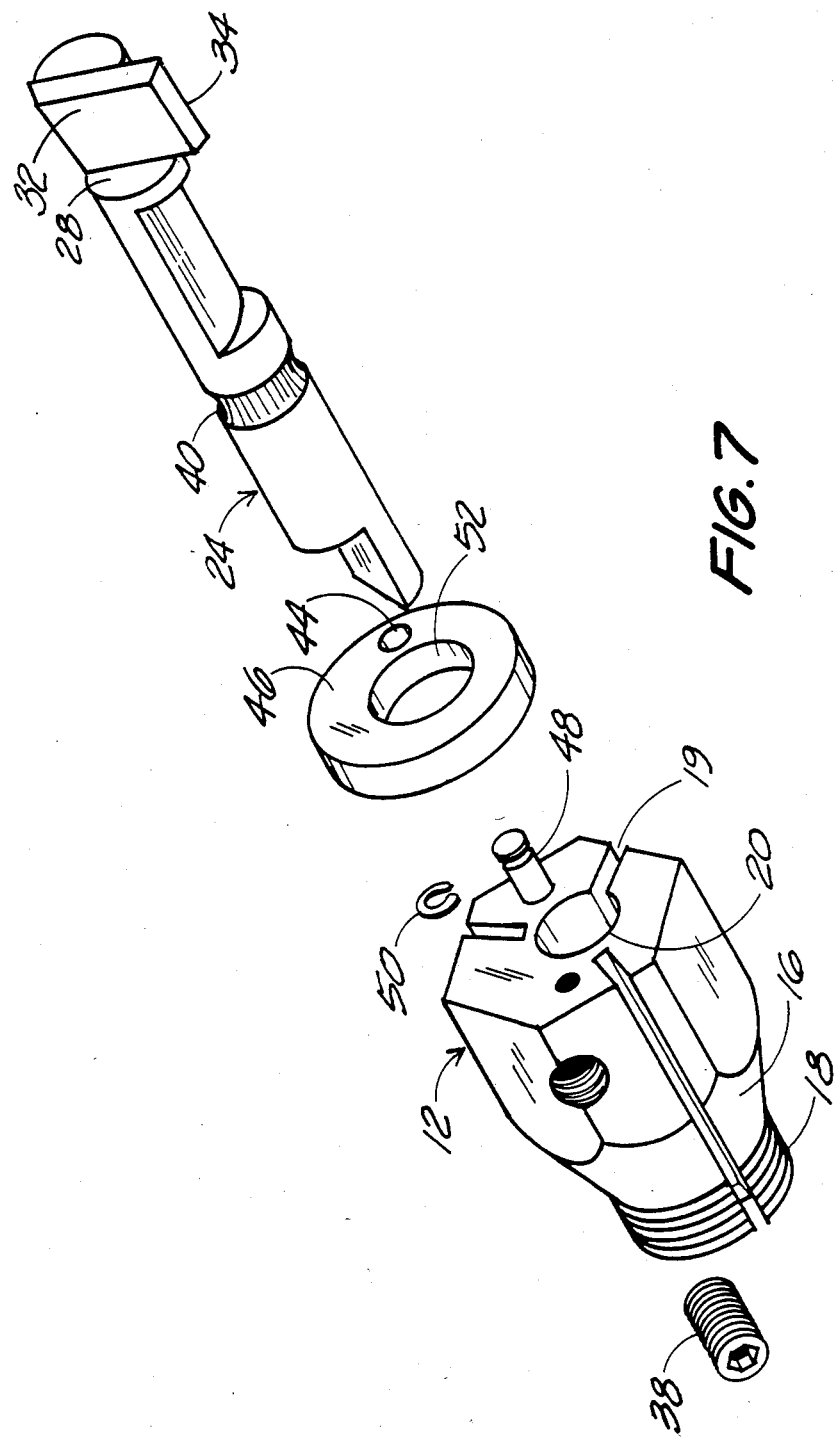
FIG. 7 is an exploded view of the preferred embodiment shown in perspective.

FIGS. 1, 3, and 5 show the router bit with its cutting edge 34 adjusted for the minimum width of dado. FIG. 2 shows the cutter adjusted to produce a dado of maximum width.

The router bit includes a main body 12 that replaces the collet of the chuck of the router. The main body includes a tapered portion 16 and a threaded portion 18 to fit the router chuck. The router machine rotates the main body about the axis of rotation 14.

The main body includes a bore 20 whose axis 22 is parallel to but offset from the axis 14 of rotation of the main body. An arbor 24 occupies the space within the bore, and the compression gap 19 insures that the arbor will be tightly held by the main body after the router bit has been installed in the router chuck.

The arbor 24 includes a projecting portion 26 that extends beyond the main body 12 and that terminates at the end 28. A portion 30 of the projecting portion 26 of the arbor is ground down to serve as a cam in moving the counterweight 46, as will be explained below.

A cutter 32 is braised or otherwise affixed to the end 28 of the arbor. The cutter includes the cutting edge 34. A portion 40 of the arbor is hobbed so that it can be driven by the worm gear 36 by use of an Allen wrench inserted into the socket 38. The worm gear is retained within the main body 12 by the pin 39.

Rotation of the arbor within the bore 20 is produced when the user turns the worm gear 36. The stop pin 42 of FIG. 5 limits the extent of the angular movement of the arbor in both directions. The flattened portion 44 of the arbor bears against the stop pin 42 in these positions.

The disk-like counterweight 46 is connected to the main body by means of the pin 48 and the snap ring 50. The counterweight 46 also includes a hole 52 whose center is displaced from the center of the counterweight. Accordingly, the center of gravity of the counterweight is to the left of the geometric center of the counterweight 46, as viewed in FIG. 1. Consequently, when the router bit is rotated by the router in either direction, centrifugal force urges the counterweight 46 to pivot in a clockwise direction about the pin 48, so that the right side of the hole 52 in the counterweight is brought to bear against the projecting portion 26 of the arbor.

It is noted that the ground-down eccentric portion 30 of the arbor extends only on the same side of the arbor as the cutting edge 34.

Assuming the assembly is balanced in the configuration of FIG. 1, wherein the blade is adjusted for making the minimum size cut, then it will be seen that when the blade has been rotated to the other extreme position shown in FIG. 2, wherein the cutting edge 34 is farther from the axis 14, then the counterweight 46 needs to be shifted to the left as viewed in FIG. 2 to compensate for the rightward movement of the cutter 32. As shown in FIG. 2, the ground-down eccentric portion 30 of the arbor 24 does, in fact, permit the counterweight 46 to pivot to the left (clockwise about the pin 48) to counteract the mass unbalance caused by movement of the cutter blade. In this manner, balance is maintained, at least approximately, throughout the entire range of adjustment of the router bit.

After much use and much shapening of the cutter blade 34, it may be desirable to reduce the thickness of the counterweight 46 to avoid over-compensation. Likewise, if a larger or heavier cutter is substituted, a thicker counterweight should be used. A number of cutters, each covering a different range of size of the dado produced are available, and an appropriate counterweight is supplied with each cutter blade.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. An adjustable router bit for cutting dadoes of various widths and characterized by remaining statically balanced throughout its range of adjustment, comprising in combination:

a main body having an axis of rotation and including a bore parallel to but offset from said axis of rotation;

an arbor fitting within the bore of the main body with a loose sliding fit for rotation about the axis of the bore, said arbor including a projecting portion extending from the bore of said main body to an end, said projecting portion including an eccentric portion;

a cutter affixed to the end of the projecting portion of said arbor and having a cutting edge that is displaced from the axis of the bore;

means within said main body for rotating said arbor to a chosen angular position within the bore and for holding said arbor at that position, whereby as said arbor is rotated, the displacement of the cutting edge of said cutter from the axis of said main body is altered to alter the width of the dado; and, a counterweight having a center of gravity and pivotally attached to said main body with the center of gravity displaced from the axis of rotation of said main body so as to be urged by centrifugal force to an operating position against the eccentric portion of said arbor when said main body is rotated about its axis of rotation, the eccentric portion of said arbor shaped to alter the operating position of said counterweight as the displacement of the cutting edge is adjusted to approximately counteract the unbalance caused by alterations in the displacement of the cutting edge from the axis of rotation of said main body.

2. The adjustable router bit of claim 1 wherein said main body further includes a front face perpendicular to the axis of rotation and wherein said counterweight has the form of a disk pivotally pinned to the front face of said main body and including portions defining a non-concentric hole against which portions the eccentric portion of said arbor bears when said adjustable router bit is in use.

3. An adjustable router bit for cutting dadoes of various widths, characterized by remaining statically balanced throughout its range of adjustment, comprising:

a main body having an axis of rotation and including a bore parallel to but off-set from said axis of rotation;

an arbor fitting within the bore of the main body with a loose sliding fit for rotation about the axis of the bore, said arbor including a hobbed portion lying within the bore of said main body, and further including a projecting portion extending from the bore of said main body to an end, said projecting portion including an eccentric portion;

a cutter affixed to the end of the projecting portion of said arbor and having a cutting edge that is displaced from the axis of the bore;

a worm gear mounted for rotation within said main body and engaging the hobbed portion of said arbor for rotating said arbor within the bore of said main body, whereby as said arbor is rotated, the displacement of the cutting edge of said cutter from the axis of said main body is altered to alter the width of the dado; and, a counterweight having a center of gravity and pivotally attached to said main body with the center of gravity displaced from the axis of rotation of the main body so as to be urged by centrifugal force to an operating position against the eccentric portion of said arbor when said main body is rotated about its axis of rotation, the eccentric portion of said arbor shaped to alter the operating position of said counterweight as said worm gear is turned to adjust the displacement of the cutting edge to approximately counteract the unbalance caused by alterations in the displacement of the cutting edge from the axis of rotation of said main body.

4. The adjustable router bit of claim 3 wherein said main body further includes a front face perpendicular to the axis of rotation and wherein said counterweight has the form of a disk pivotally pinned to the front face of said main body and including portions defining a nonconcentric hole against which portions the eccentric portion of said arbor bears when said adjustable router bit is in use.

* * * * *